(12) United States Patent
Perloff

(10) Patent No.: US 7,197,498 B2
(45) Date of Patent: Mar. 27, 2007

(54) APPARATUS, SYSTEM AND METHOD FOR UPDATING A SORTED LIST

(75) Inventor: Ronals S. Perloff, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 10/609,954

(22) Filed: Jun. 30, 2003

(65) Prior Publication Data

US 2004/0267772 A1 Dec. 30, 2004

(51) Int. Cl.
*G06F 17/30* (2006.01)

(52) U.S. Cl. .................................. 707/7; 707/100
(58) Field of Classification Search .................... 707/7, 707/100, 101, 102, 103 R, 104.1
See application file for complete search history.

(56) References Cited

U.S. PATENT DOCUMENTS

| | | | | |
|---|---|---|---|---|
| 4,414,624 A | * | 11/1983 | Summer et al. ............... | 712/21 |
| 4,870,576 A | * | 9/1989 | Tornetta .......................... | 705/1 |
| 5,032,989 A | * | 7/1991 | Tornetta .......................... | 705/1 |
| 5,297,207 A | * | 3/1994 | Degele .......................... | 380/46 |
| 5,555,409 A | * | 9/1996 | Leenstra et al. ............. | 707/101 |
| 5,619,274 A | * | 4/1997 | Roop et al. .................. | 348/461 |
| 5,644,692 A | * | 7/1997 | Eick ............................. | 715/833 |
| 5,710,899 A | * | 1/1998 | Eick ............................. | 715/764 |
| 5,742,777 A | * | 4/1998 | Eick ............................. | 715/787 |
| 5,973,643 A | * | 10/1999 | Hawkes et al. ............. | 342/457 |
| 6,018,735 A | * | 1/2000 | Hunter .......................... | 707/5 |
| 6,056,956 A | * | 5/2000 | Cobbold et al. ......... | 424/144.1 |
| 6,542,883 B1 | * | 4/2003 | Salo .............................. | 707/1 |
| 6,687,688 B1 | * | 2/2004 | Fujihara et al. ................. | 707/3 |
| 6,959,303 B2 | * | 10/2005 | Rajasekaran et al. ....... | 707/102 |
| 2002/0052742 A1 | * | 5/2002 | Thrasher et al. ............ | 704/251 |
| 2002/0078035 A1 | * | 6/2002 | Frank et al. .................... | 707/3 |
| 2004/0215398 A1 | * | 10/2004 | Mixon et al. ................. | 702/19 |
| 2004/0267772 A1 | * | 12/2004 | Perloff ......................... | 707/100 |
| 2005/0050203 A1 | * | 3/2005 | Chattopadhyay et al. ... | 709/227 |
| 2005/0091054 A1 | * | 4/2005 | Thrasher et al. ............ | 704/254 |
| 2005/0216727 A1 | * | 9/2005 | Chattopadhyay et al. ... | 713/151 |

OTHER PUBLICATIONS

Kruse, Data Structures and Program Design, 4.2, Insertion sort, pp. 140-142.*

* cited by examiner

*Primary Examiner*—Frantz Coby
(74) *Attorney, Agent, or Firm*—Buckley, Maschoff & Talwalkar LLC

(57) ABSTRACT

A method, apparatus, and system for updating a sorted list.

28 Claims, 3 Drawing Sheets

Sorting System

APPARATUS, SYSTEM AND METHOD FOR UPDATING A SORTED LIST

BACKGROUND

In certain computer applications such as databases, items of information are stored in memory or a storage device in a sorted list format. As all characters and numbers stored in such memory or storage devices are represented by a series of bits in binary, forming one or more bytes or words, the binary value associated with the characters or numbers may be sorted from highest to lowest to order the items of information. When an item in the sorted list is to be located, a searching technique such as a binary search may be employed. In a binary search, the desired item is compared with the item located at the halfway point in the list. If the desired item is smaller than the value stored in the sorted list at the halfway point, then the first half of the list is accepted and the second half is rejected. If the desired item is larger than the value stored in the sorted list at the halfway point, then the second half of the list is accepted and the first half is rejected. The item at the center point of the accepted half of the list is then compared to the desired item and the process is repeated, each time selecting half of the accepted list and rejecting the other half, until the desired item is located. An item to be deleted may be removed from its location in the list once found and every item in numerically higher memory locations than that of the removed item may be reordered by moving it to the numerically next lower memory location in the list. Similarly, when an item is to be added to the list, a binary search may be similarly used to locate two items in the sorted list between which the item to be added belongs. That item to be added may then be added to the list between those two items and every item in numerically higher memory locations than the added item in the list may be reordered by moving it to the numerically next higher location in the list. As the size of a sorted list increases, the amount of time and processing power required for adding and deleting entries increases since, on average, such an operation will require relocating half the elements in the list.

BRIEF DESCRIPTION OF THE DRAWINGS

The accompanying drawings, wherein like reference numerals are employed to designate like components, are included to provide a further understanding of the present adding and deleting from a sorted list, are incorporated in and constitute a part of this specification, and illustrate embodiments of adding and deleting from a sorted list that together with the description serve to explain the principles of adding to and deleting from a sorted list.

In the drawings.

DETAILED DESCRIPTION

Figure 1:
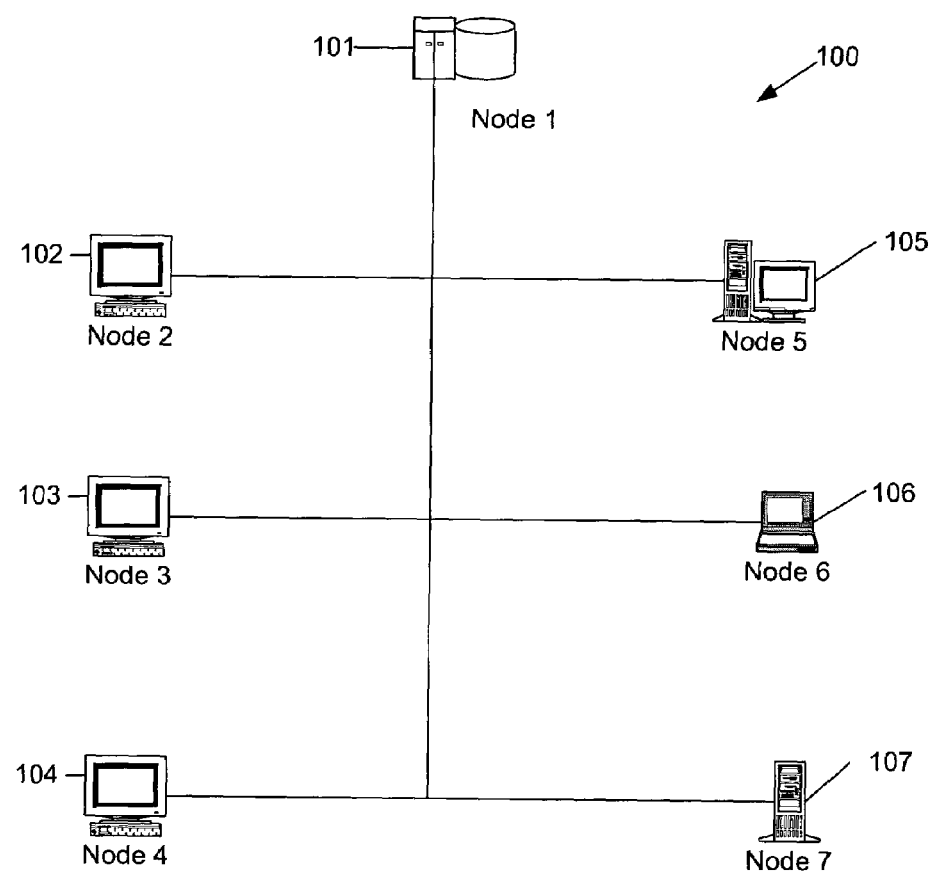
FIG. 1 is a block diagram of a system suitable for practicing an embodiment of adding to and deleting from a sorted list.

Reference will now be made in detail to the preferred embodiments of the present sorted list updating techniques, examples of which are illustrated in the accompanying drawings. It is to be understood that the Figures and descriptions of embodiments included herein illustrate and describe elements that are of particular relevance, while eliminating, for purposes of clarity, other elements found in typical computers and computer networks.

The techniques described herein provide improved techniques for adding items to and deleting items from a sorted list. Other details, features, and advantages of the sorted list updating techniques will become further apparent in the following detailed description of the embodiments.

Any reference in the specification to "one embodiment," "a certain embodiment," or a similar reference to an embodiment is intended to indicate that a particular feature, structure, or characteristic described in connection with the embodiment is included in at least one sorted list updating embodiment. The appearances of such terms in various places in the specification are not necessarily all referring to the same embodiment. References to "or" are furthermore intended as inclusive so "or" may indicate one or the other ored terms or more than one ored term.

Information may comprise any data capable of being represented as a signal, such as an electrical signal, optical signal, acoustical signal and so forth. Examples of information in this context may include, for example records, each including information related to a person, such as name, social security number, birth date, and address, or any other grouping of information that is desired. Each piece of information or grouping of information to be stored will be referred to herein as an item of information and may be stored in a location in the sorted list.

Embodiments of the present sorted list updating techniques may be implemented in a single node or a network of nodes.

In an embodiment, a system in which a sorted list is updated is contemplated. The system in which a sorted list is updated includes at least two nodes coupled to a network and a storage node coupled to the network. The storage node includes a storage device containing a sorted list, memory containing an add queue containing items to be added to the sorted list and a delete queue containing items to be deleted from the sorted list, and a processor. The processor contains instructions that, when executed, cause the processor to select an item from the delete queue and remove that item from the sorted list, iteratively redefine a position of each item in the sorted list by one position from the location of the removed item to a position in which the item from the add queue is to be added, and add the item from the add queue to the sorted list in the last vacated position. A plurality of nodes may furthermore be coupled to the network and each of those nodes may place items in the add queue or place items in the delete queue.

FIG. 1 illustrates a system in which a sorted list is updated 100 in which embodiments of the present updating of a sorted list may be implemented. Node 1 101 may include a storage device and a processor that controls read and write operations to and from the storage device. Node 2 102, node 3 103, and node 4 104 may be, for example, general purpose computers, client processors, processor based cash registers, or any other nodes that receive information to be placed in the sorted list or through which instructions may be provided to remove an item from the list. Node 5 105 and node 7 may be, for example, servers and node 6 106 may be, for example, a notebook or other portable computer. Any of those nodes 101–107 may include an implementation of an embodiment of the present sorted list addition and deletion techniques. Alternately, a node such as node 1 101 may maintain the sorted list, an add queue, and a delete queue and other nodes 102–107 may transmit instructions to node 1 101 to have items added or deleted. The nodes 101–107 illustrated in FIG. 1 are coupled to a network 108 and may communicate therewith, although embodiments of the sorted list addition and deletion techniques may be implemented on stand alone nodes.

The nodes 101–107 of FIG. 1 may be computers, dumb terminals, or other typically processor-based devices, interconnected by one or more forms of communication media. Typical interconnected devices range from handheld computers and notebook PCs to high-end mainframe and supercomputers. The communication media coupling those devices may include twisted pair, co-axial cable, optical fibers and wireless communication techniques such as use of radio frequency. The network may be, for example, a local area network (LAN), wide area network (WAN), or the Internet.

A device for adding items to and deleting items from a sorted list is also contemplated. That device includes a sorted list, an add queue containing items to be added to the sorted list, a delete queue containing items to be deleted from the sorted list, and a processor. The processor contains instructions that, when executed, cause the processor to select an item from the delete queue and remove that item from the sorted list, iteratively redefine a position of each item in the sorted list by one position from the location of the removed item to a position in which the item from the add queue is to be added, and add the item from the add queue to the sorted list in the last vacated position.

It should be recognized that the present techniques for updating a sorted list could also be performed by dedicated hardware including, for example, a multi-component circuit or an application specific integrated circuit.

Another device for updating a sorted list is contemplated that includes a storage device and a processor. The storage device contains a sorted list of items, an add queue containing items to be added to the sorted list, and a delete queue containing items to be deleted from the sorted list. The processor contains instructions that, when executed, cause the processor to select an item from the delete queue and remove that item from the sorted list, iteratively redefine a position of each item in the sorted list by one position from the location of the removed item to a position in which the item from the add queue is to be added, and add the item from the add queue to the sorted list in the last vacated position.

Figure 2:
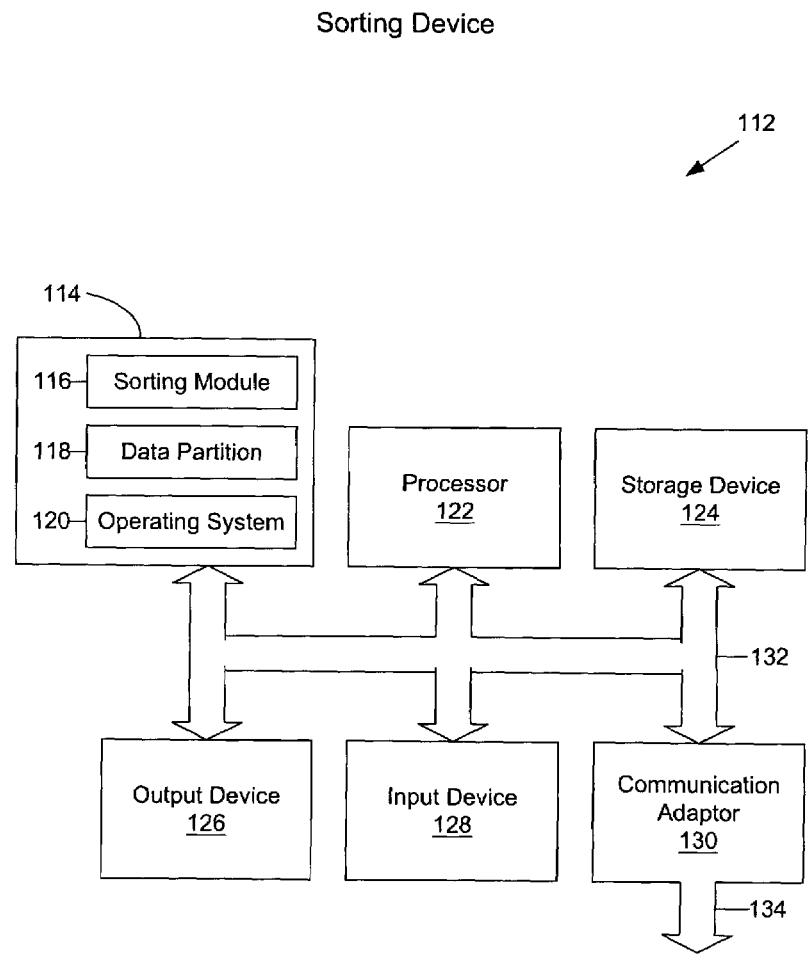
FIG. 2 is a block diagram of a device suitable for practicing an embodiment of adding to and deleting from a sorted list.

FIG. 2 illustrates a sorted list updating device 112 in an embodiment in which sorting is performed in a workstation. That sorted list updating device 112 includes memory 114, a processor 122, a storage device 124, an output device 126, an input device 128, and a communication adaptor 130. It should be recognized that any or all of the components 114–134 of the sorting device 112 may be implemented in a single machine or in multiple networked machines. Communication between the processor 122, the storage device 124, the output device 126, the input device 128, and the communication adaptor 130 may be accomplished by way of one or more communication busses 132. It should be recognized that the sorted list updating device 112 may have fewer components or more components than shown in FIG. 2. For example, if a user interface is not desired, the input device 128 or output device 126 may not be included with the sorted list updating device 112.

The memory 114 may, for example, include random access memory (RAM), dynamic RAM, and/or read only memory (ROM) (e.g., programmable ROM, erasable programmable ROM, or electronically erasable programmable ROM) and may store computer program instructions and information. The memory 114 may furthermore be partitioned into sections in which operating system 120 instructions are stored, a data partition 118 in which data is stored, and a sorted list updating module partition 116 in which instructions for adding items to and deleting items from a sorted list may be stored. The sorted list updating module partition 116 may also allow execution by the processor 122 of the program instructions to add items desired to be added to the sorted list or removed items from the sorted list, utilizing one or more nodes 101–107. The data partition 118 may furthermore store data to be used during the execution of the program instructions such as, for example, an add queue containing items to be added to the sorted list and a delete queue of items to be deleted from the sorted list.

The processor 122 may, for example, be an Intel® Pentium® type processor or another processor manufactured by, for example Motorola®, Compaq®, AMD®, or Sun Microsystems®. The processor 122 may furthermore execute the program instructions and process the data stored in the memory 114. In one embodiment, the instructions are stored in memory 114 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 124 may, for example, be a magnetic disk (e.g., floppy disk and hard drive), optical disk (e.g., CD-ROM) or any other device or signal that can store digital information. The communication adaptor 130 may permit communication between the sorted list updating device 112 and other devices or nodes coupled to the communication adaptor 130 at the communication adaptor port 134. The communication adaptor 130 may be a network interface that transfers information from nodes on a network to the sorted list updating device 112 or from the sorted list updating device 112 to nodes on the network. The network may be a local or wide area network, such as, for example, the Internet, the World Wide Web, or the system in which a sorted list is updated 100 illustrated in FIG. 1. It will be recognized that the sorted list updating device 112 may alternately or in addition be coupled directly to one or more other devices through one or more input/output adaptors (not shown).

The sorted list updating device 112 may also be coupled to one or more output devices 126 such as, for example, a monitor or printer, and one or more input devices 128 such as, for example, a keyboard or mouse. It will be recognized, however, that the sorted list updating device 112 does not necessarily need to have an input device 128 or an output device 126 to operate. Moreover, the storage device 124 may also not be necessary for operation of the sorted list updating device 112.

The elements 114, 122, 124, 126, 128, and 130 of the sorted list updating device 112 may communicate by way of one or more communication busses 132. Those busses 132 may include, for example, a system bus, a peripheral component interface bus, and an industry standard architecture bus.

A method of updating a sorted database is also contemplated. That method includes placing an identification of an item to be added to the database in an add queue, placing an identification of an item to be deleted from the database in a delete queue, selecting the item from the add queue and the item from the delete queue, removing the identified item to be deleted from the database, iteratively redefining the position of each item in the sorted list by one position from the location of the removed item to the position in which the item from the add queue is to be added, and adding the item from the add queue to the sorted list in the last vacated position.

Figure 3:
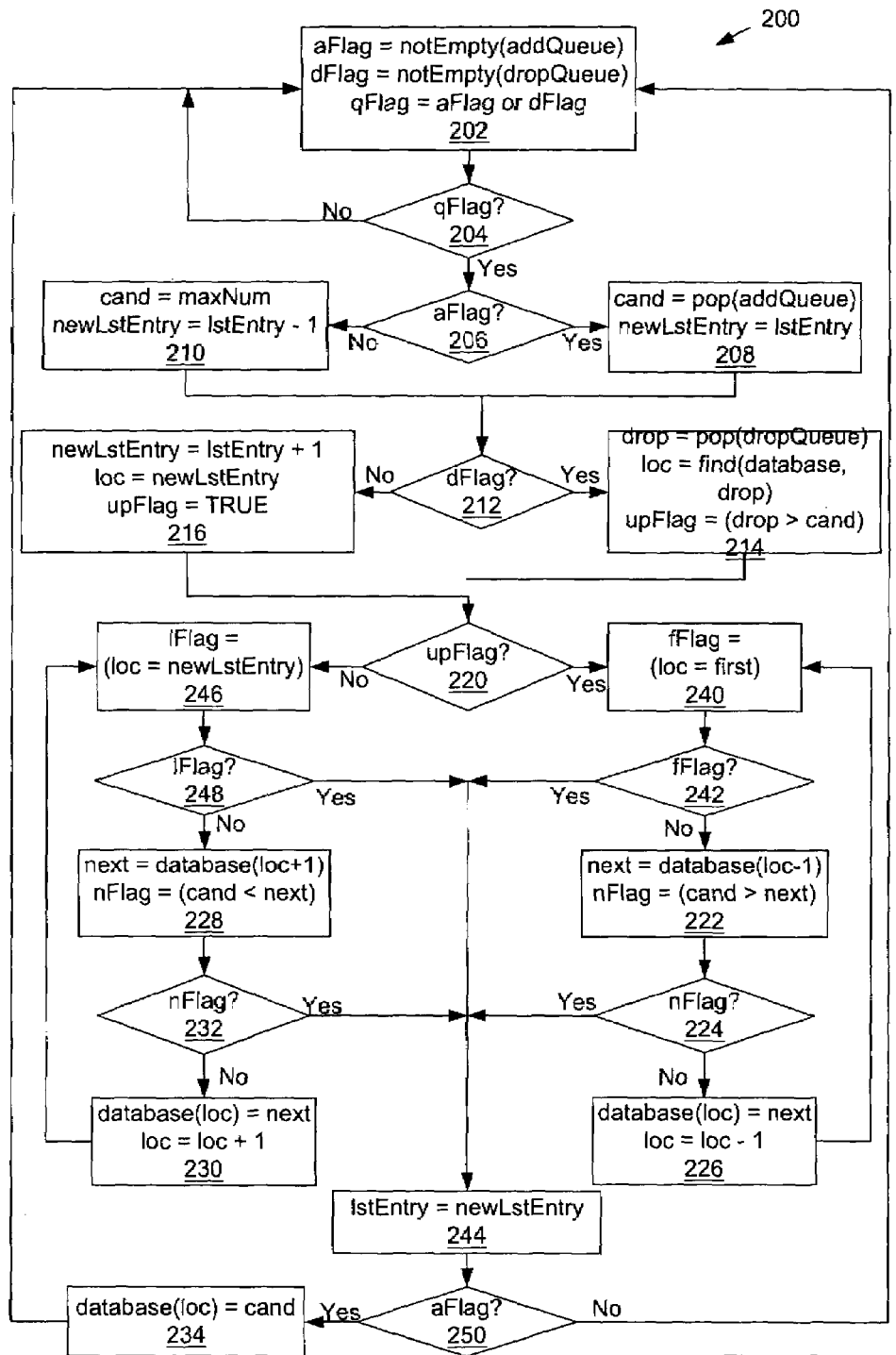
FIG. 3 is a flowchart depicting an embodiment of a method of adding to and deleting from a sorted list.

FIG. 3 illustrates an embodiment of a method for adding items to and deleting items from a sorted list 200. That method utilizes an add queue in which one or more items to be added to the sorted list may be identified and a delete queue in which one or more items to be deleted from the sorted list may be identified. With respect to the add queue, an identifier of the item to be added to the sorted database may be included in the queue. That identifier may include a rank of the item to be added, an item identifier, the item itself, or a combination of the rank, identifier, or item. With respect to the delete queue, the item to be deleted, an identifier of the item to be deleted from the sorted database, or a rank of the item to be removed may be provided to identify the appropriate item that is to be removed from the sorted list. The ranks of the items in the added queue and the deleted queue may be a numeric rank value.

The items in the add queue and the delete queue may be numerical, alphabetical, or a combination of numerical and alphabetical characters. Letters may, for example, be associated with values that increase progressing from the beginning of the alphabet to the end of the alphabet. For example, letters may be represented by binary values in a system such as the ASCII system. Utilizing such a system, letters, numbers, and strings of letters and numbers may be sorted by ordering them by the binary value associated with those letters and numbers. Sorting may furthermore be performed on the basis of an entire item or a portion of information contained in the item.

At 202, the method for adding items to and deleting items from a sorted list 200 computes a queue flag that contains a determination of whether the queues contain items to be added and deleted. That determination may be performed by first reading at least a portion of the add queue and making a determination as to whether at least one item resides in the add queue. That determination may be performed by setting an add flag (aFlag) equal to a zero or false value if the add queue is empty (notEmpty(addQueue)) and setting the add flag to one or true if the add queue contains at least one item and so is not empty, at 202. Next, at least a portion of the delete queue is read to make a determination as to whether at least one item resides in the delete queue. That determination may be performed by setting a delete flag (dFlag) equal to zero or false if the delete queue is empty (notEmpty(dropQueue)), at 202 and setting the delete flag to one or true if the delete queue contains at least one item and so is not empty. A queue flag (qFlag) may then be set equal to the add flag or the delete flag (aFlag or dFlag). The add flag and delete flag may be logically ored so that if the add flag and the delete flag both have one or true values the result of the oring will be one or true, if either one of the add flag or the delete flag has one or true values the result of the oring will be one or true, and if both of the add and delete flags have zero of false values the result of the oring will be zero or false. Thus the determination performed at 202 is true if there is at least one item in either the add queue or the delete queue.

At 204, the queue flag is reviewed. If the queue flag contains a zero or false value indicating that neither the add nor delete queues contain at least one item, then the process returns to 202, performing no additional acts until at least one item is found in either one of the add and delete queues. If the queue flag contains a one or true, indicating that at least one item does exist in at least one of the add and delete queues at 204, then the process proceeds to 206.

At 206, the add flag is reviewed. If the add flag has a value of one or true, indicating that at least one item exists in the add queue, then a variable that may be called candidate (cand), for example, is set equal to an item in the add queue to be added in the present iteration at 208. That item that candidate is set equal to may reside at the top of the add queue and be the item that has resided in the add queue for the longest time where more than one item resides in the add queue by, for example, setting candidate equal to pop (addQueue) as shown at 208. A variable such as lstEntry may be maintained that is set equal to the location of the last valid entry in the sorted list. Another variable such as newLstEntry may be used to track the new location of the last valid entry in the sorted list as the method for adding items to and deleting items from a sorted list 200 is performed. At 208, newLstEntry may be set equal to the value of lstEntry where an item is being added.

If the add flag has a value of zero or false, indicating that no items exist in the add queue, then candidate may be set equal to the largest value that may be held by an item in the add queue or the sorted list at 210. Also, to track the new location of the last valid entry in the sorted list, a variable equal to the number of items in the list such as newLstEntry may be set equal to the value of lstEntry−1 at 210 to account for there being no item to add.

At 212, the delete flag is reviewed after the add queue has been reviewed regardless of whether any items resided in the add queue. It should be recognized that the add flag and delete flag may be reviewed in any order desired. If the delete flag has a value of one or true, indicating that at least one item exists in the delete queue, then a variable that may be called drop, for example, is set equal to an item in the delete queue at 208. That item that drop is set equal to may reside at the top of the delete queue and be the item that has resided in the delete queue for the longest time where more than one item resides in the delete queue by, for example, setting drop equal to pop(dropQueue) as shown at 214. A variable such as loc may be used to indicate the next location into which an entry may be written. At 214 loc is initially set to the location of the item to be dropped from the list (loc=find(database,drop)). Finally at 214, the direction in which items in the list will be moved is determined by setting upFlag to true if the value of the drop item is greater than that of the candidate item (upFlag=drop>cand). If the delete flag has a value of zero or false, indicating that no items exist in the delete queue, then to track the new location of the last valid entry in the sorted list, the new location of the largest item in the list, newLstEntry, is set to lstEntry+1 at 216 to account for the list growing by one item since no item will be deleted. Also at 216, loc is set to that new location of the top of the list and upFlag is set to TRUE.

It should be noted that alternately, the location at which the item to be added is to be inserted may be determined and a determination as to whether the item to be deleted is to be removed from the sorted list at a point above or below the added item may be made. Any known method including, for example, a binary search may be utilized to find the location in the sorted list in which the item to be added should be inserted. If no item to be added was found in the add queue and candidate was assigned the maximum value that may be held in the add queue or sorted list at 210, then the location in the sorted list in which the item to be added should be inserted will be the last item in the list. Where the sorted list has a limited size, it may also be that the method will include checking to assure that when there is an item to be added but none to be deleted, that the addition of the item to be added will not cause the sorted list to exceed its maximum size.

In determining whether the item to be added is to be inserted in the sorted list above or below the deleted item, a variable such as upFlag may be set equal to drop>cand such that upFlag will have a value of one or true if the item to be deleted is in a position greater than the position in which the candidate to be added is to be added to the sorted list and upFlag will have a value of zero or false if the item to be deleted is in a position less than the position in which the candidate to be added is to be added to the sorted list. Other calculations may also be used to determine the relative positions of the item to be added and the item to be deleted from the sorted list.

At 220, the determination of the relative positions of the item to be added and the item to be deleted from the sorted list is reviewed so that a determination may be made as to whether items should be shifted to the next numerically lower or higher position in the sorted list. If upFlag is a one or true, then items located from the location of the deleted item to the location of the item to be added are each shifted to the numerically next higher position by a method such as that shown at 222 to 226. If upFlag is a zero or false, then items located from the location of the deleted item to the location of the item to be added are shifted to the numerically next lower position by a method such as that shown at 228 to 232.

At 240, a test is performed to determine whether an item to be added to the sorted list is to be added before the first item currently in the sorted list. The item to be added may have a value or an associated value that is less than that of the first item in the sorted list indicating it is to be added before the first item currently in the sorted list. As the variable loc decrements at 226 from the location of the item to be deleted to the location of the candidate to be added, loc may be checked to determine whether loc is equal to the numerically lowest memory location in the list at 240. Where the value of loc reaches the numerically lowest memory location in the list, the item to be added is to be added before the first item in the current sorted list, and a flag indicating the item is to be added before the first existing item in the sorted list, such as fFlag, may be set to one or true. If the item to be added is not to be added before the first item in the sorted list, but is to be added anywhere after the first item in the sorted list, then fFlag may be set to zero or false.

At 242, if fFlag is true or one, then lstEntry is set equal to newLstEntry at 244 and the candidate item is written to the current database position at 234 if there is to be an item added to the list, as tested at 250. If fFlag is false or zero, then the method 200 proceeds to 222.

At 222, a variable such as "next" may be set equal to the value of the item held at the next numerically lower location in the database than that indicated by the loc variable. A variable such as nFlag may be set equal to one or true if the candidate item to be added is greater than next and set to zero of false if the candidate item to be added is not greater than next to determine whether the location for insertion of the item to be added has been reached.

At 224, if nFlag is zero or false, then the current database location is set to next to move the item read into next from the previous database location at 222 into the current database location at 226. The current location is then decremented (loc=loc−1) at 226 and 222 is performed again with the new location. If nFlag is one or true, then the position in which the candidate to be added is to be located has been reached, lstEntry is set equal to newLstEntry at 244, and the candidate item is written to the current database position at 234 if there is to be an item added to the list, as tested at 250.

At 246, where upFlag is zero or false indicating that items are to be shifted to numerically lower locations in the sorted list from the lower value item to be deleted to the higher value candidate item to be added, a test is performed to determine whether the item to be added is to be added after the last item currently in the sorted list. The item to be added may have a value or an associated value that is greater than that of the last item in the sorted list indicating it is to be added after the last item currently in the sorted list. Where an item to be added is to be added after the last item in the current sorted list, a flag indicating the item is to be added after the last existing item in the sorted list, such as IFlag, may be set to one or true. If the item to be added is not to be added after the last item in the sorted list, then IFlag may be set to zero or false.

At 248, if IFlag is true or one, then lstEntry is set equal to newLstEntry at 244 and the candidate item is written to the current database position at 234 if there is to be an item added to the list, as tested at 250. If IFlag is false or zero, then the method 200 proceeds to 228.

At 228, where upFlag is zero or false, next may be set equal to the value of the item held in the next numerically higher location in the database than that indicated by the loc variable. nFlag may be set equal to one or true if the candidate item to be added is less than next and set to zero of false if the candidate item to be added is not less than next to determine whether the location for insertion of the item to be added has been reached.

At 232, if nFlag is zero or false, then the current database location is set to the value of the variable next to move the item read into the variable next from the previous database location at 228 into the current database location at 230. The current location is then incremented (loc=loc+1) at 230 and 228 is performed again with the new location. If nFlag is one or true, then the position in which the candidate to be added is to be located has been reached, lstEntry is set equal to newLstEntry at 244, and the candidate item is written to the current database position at 234 if there is to be an item added to the list, as tested at 250.

The method may then repeat by returning to 202 so that additional items in one or both of the add queue and the delete queue may be added to or deleted from the sorted list.

Thus the method for adding items to and deleting items from a sorted list 200 may handle four queue states: a state wherein both queues are empty wherein the method 200 simply waits until an item is placed in at least one of the queues; a state wherein both queues contain items and the method 200 removes a delete queue item from the sorted list and adds an add queue item to the sorted list in a single iteration of the method 200; a state wherein the add queue contains an item and the delete queue does not contain an item and the method 200 adds the item from the add queue without removing any items; and a state wherein the delete queue contains an item and the add queue does not contain an item and the method 200 deletes the item from the delete queue without adding any items.

An article of manufacture for adding items to and deleting items from a sorted list is also contemplated. The article of manufacture includes a computer readable medium having stored thereon instructions. When the instructions are executed by a processor, the instructions cause the processor to place an identification of an item to be added to the database in an add queue, place an identification of an item to be deleted from the database in a delete queue select the item from the add queue and the item from the delete queue, remove the identified item to be deleted from the database, iteratively redefine the position of each item in the sorted list by one position from the location of the removed item to the position in which the item from the add queue is to be added, and add the item from the add queue to the sorted list in the last vacated position.

While the systems, apparatuses, and methods of updating a sorted list have been described in detail and with reference to specific embodiments thereof, it will be apparent to one skilled in the art that various changes and modifications can be made therein without departing from the spirit and scope thereof. For example, the systems, apparatuses, and methods for adding items to and deleting items from a sorted list may be embodied in application specific circuitry. Thus, persons skilled in the art will recognize from this description other embodiments may be practiced with modifications and alterations limited only by the claims.

What is claimed is:

1. A medium storing instructions adapted to be executed by a processor to perform a method of updating a sorted database, the method comprising:
   identifying an item to be added to the database and a position in the sorted database in which the item to be added is to be added, wherein the item to be added is retrieved from an add queue;
   identifying an item to be deleted from the database and a position of the item to be deleted in the sorted database, wherein the item to be deleted is retrieved from a delete queue;
   deleting the item to be deleted from the database;
   iteratively redefining the position of each item in the sorted list by one position from the location of the deleted item to the position in which the item to be added is to be added; and
   adding the item to be added to the sorted list in the last vacated position.

2. The medium of claim 1, wherein the method further comprises:
   ranking a plurality of items in the add queue;
   ranking a plurality of items in the delete queue;
   and wherein selection of the item to be added is based on rank, and wherein selection of the item to be deleted is based on rank.

3. The medium of claim 1, wherein the method further comprises:
   determining the time a plurality of items have resided in the add queue;
   determining the time a plurality of items have resided in the delete queue;
   and wherein selection of the item to be added is based on time, and wherein selection of the item to be deleted is based on time.

4. The medium of claim 1, wherein the database position in which the item to be added is to be added is a position in which a previous item in the sorted database immediately prior to the position has a numeric value less than the item to be added and a following item in the sorted database immediately following the position has a numeric value greater than the item to be added.

5. The medium of claim 1, wherein the database position in which the item to be added is to be added is a position in which a previous item in the sorted database immediately prior to the position has an associated position value less than the item to be added and a following item in the sorted database immediately following the position has an associated position value greater than the item to be added.

6. The medium of claim 1, wherein iteratively redefining the position includes redefining the position of each item from the location of the deleted item to the position in which the item to be added to a position immediately prior to its current position when the item from the add queue is to be located in a position prior to the deleted item.

7. The medium of claim 1, wherein iteratively redefining the position includes redefining the position of each item from the location of the removed item to the position in which the item to be added to a position immediately following its current position when the item from the add queue is to be located in a position after the deleted item.

8. A medium storing instructions adapted to be executed by a processor to perform a method of updating a sorted database, the method comprising:
   placing an identification of an item to be added to the database in an add queue;
   placing an identification of an item to be deleted from the database in a delete queue;
   selecting the item from the add queue and the item from the delete queue;
   removing the identified item to be deleted from the database;
   iteratively redefining the position of each item in the sorted list by one position from the location of the removed item to the position in which the item from the add queue is to be added; and
   adding the item from the add queue to the sorted list in the last vacated position.

9. The medium of claim 8, wherein the add queue contains identifications of more than one item to be added to the database.

10. The medium of claim 9, wherein the item selected from the add queue is the item that has been in the add queue for the longest time.

11. The medium of claim 8, wherein the delete queue contains identifications of more than one item to be deleted from the database.

12. The medium of claim 11, wherein the item selected from the add queue is the item that has been in the add queue for the longest time.

13. The medium of claim 8, wherein the identification of the item to be deleted from the database includes a number associated with the position of the item to be deleted.

14. The medium of claim 8, further comprising removing the items selected from the add queue and the delete queue from those queues.

15. The medium of claim 8, wherein the database position in which the item from the add queue is to be added is a position in which a previous item in the sorted database immediately prior to the position has a numeric value less than the item from the add queue and a following item in the sorted database immediately following the position has a numeric value greater than the item from the add queue.

16. The medium of claim 8, wherein the database position in which the item from the add queue is to be added is a position in which a previous item in the sorted database immediately prior to the position has an associated position value less than the item from the add queue and a following item in the sorted database immediately following the position has an associated position value greater than the item from the add queue.

17. The medium of claim 8, wherein iteratively redefining the position includes redefining the position of each item from the location of the removed item to the position in which the item from the add queue is to be added to a position immediately prior to its current position when the item from the add queue is to be located in a position prior to the deleted item.

18. The medium of claim 8, wherein iteratively redefining the position includes redefining the position of each item from the location of the removed item to the position in which the item from the add queue is to be added to a position immediately following its current position when the item from the add queue is to be located in a position after the deleted item.

19. A device, comprising:
   a sorted list;
   an add queue to contain items to be added to the sorted list;
   a delete queue to contain items to be deleted from the sorted list; and
   a processor to contain instructions that, when executed, cause the processor to:
      select an item from the delete queue and remove that item from the sorted list;
      iteratively redefine a position of each item in the sorted list by one position from the location of the removed item to a position in which the item from the add queue is to be added; and
      add the item from the add queue to the sorted list in the last vacated position.

20. The device of claim 19, wherein if no item exists in the add queue and an item does exist in the delete queue, then no item will be deleted from the sorted list and the iterative redefining will begin with the last item in the sorted list.

21. The device of claim 19, wherein the database position in which the item from the add queue is to be added is a position in which a previous item in the sorted database immediately prior to the position has an associated position value less than the item from the add queue and a following item in the sorted database immediately following the position has an associated position value greater than the item from the add queue.

22. A device, comprising:
   a storage device containing:
      a sorted list of items;
      an add queue to contain items to be added to the sorted list; and
      a delete queue to contain items to be deleted from the sorted list; and
   a processor to contain instructions that, when executed, cause the processor to:
      select an item from the delete queue and remove that item from the sorted list;
      iteratively redefine a position of each item in the sorted list by one position from the location of the removed item to a position in which the item from the add queue is to be added; and
      add the item from the add queue to the sorted list in the last vacated position.

23. The device of claim 22, wherein if no item exists in the add queue and an item does exist in the delete queue, then no item will be deleted from the sorted list and the iterative redefining will begin with the last item in the sorted list.

24. The device of claim 22, wherein the database position in which the item from the add queue is to be added is a position in which a previous item in the sorted database immediately prior to the position has an associated position value less than the item from the add queue and a following item in the sorted database immediately following the position has an associated position value greater than the item from the add queue.

25. A system, comprising:
   a storage node coupled to the network, the storage node having:
      a storage device to contain a sorted list;
      memory to contain an add queue containing items to be added to the sorted list and a delete queue containing items to be deleted from the sorted list; and
      a processor to contain instructions that, when executed, cause the processor to:
         select an item from the delete queue and remove that item from the sorted list;
         iteratively redefine a position of each item in the sorted list by one position from the location of the removed item to a position in which the item from the add queue is to be added; and
         add the item from the add queue to the sorted list in the last vacated position;
   a first node coupled to the network to place an item in the add queue; and
   a second node coupled to the network to place an item in the delete queue.

26. The system of claim 25, wherein the first and second nodes include processors.

27. An article of manufacture, comprising:
   a computer readable medium having stored thereon instructions which, when executed by a processor, cause the processor to:
   place an identification of an item to be added to the database in an add queue;
   place an identification of an item to be deleted from the database in a delete queue;
   select the item from the add queue and the item from the delete queue;
   remove the identified item to be deleted from the database;
   iteratively redefine the position of each item in the sorted list by one position from the location of the removed item to the position in which the item from the add queue is to be added; and
   add the item from the add queue to the sorted list in the last vacated position.

28. The article of manufacture of claim 27, wherein iteratively redefining the position includes redefining the position of each item from the location of the removed item to the position in which the item from the add queue is to be added to a position immediately prior to its current position when the item from the add queue is to be located in a position prior to the deleted item.

* * * * *